United States Patent [19]
Grubb et al.

[11] Patent Number: 5,933,438
[45] Date of Patent: Aug. 3, 1999

[54] MULTIPLE FIBER LASER PUMP SOURCES

[75] Inventors: Stephen Gregory Grubb, Fremont, Calif.; Daryl Inniss, Princeton; Kenneth Lee Walker, New Providence, both of N.J.

[73] Assignee: Lucent Technologies Inc., Murray Hill, N.J.

[21] Appl. No.: 08/910,948

[22] Filed: Aug. 8, 1997

Related U.S. Application Data

[60] Provisional application No. 60/026,906, Sep. 26, 1996.

[51] Int. Cl.$^6$ ....................................................... H01S 3/30
[52] U.S. Cl. ............................... 372/6; 372/97; 372/105; 372/106
[58] Field of Search .................................... 372/6, 27, 70, 372/71, 98, 106, 105, 97

[56] References Cited

U.S. PATENT DOCUMENTS

| | | | |
|---|---|---|---|
| 5,396,506 | 3/1995 | Bell | 372/6 |
| 5,600,665 | 2/1997 | Minden et al. | 372/6 |
| 5,659,644 | 8/1997 | DiGiovanni et al. | 385/31 |
| 5,790,722 | 9/1997 | Minden et al. | 372/6 |
| 5,844,926 | 12/1998 | Byron et al. | 372/6 |
| 5,844,927 | 12/1998 | Kringlebotn | 372/6 |

FOREIGN PATENT DOCUMENTS

723323A2  7/1996  European Pat. Off. .......... H01S 3/25

OTHER PUBLICATIONS

N.M. Lyndin et al., "Laser system composed of several active elements connected by single-mode couplers", *Quantum Electronics*, vol. 24, No. 12, pp. 1058–1061 (1994) (no month).

*Primary Examiner*—James W. Davie

[57] ABSTRACT

An optical fiber amplifier is pumped by a pair of pump lasers which have at least partially overlapping resonators. In one embodiment, the fiber gain section of the amplifier is located external to the resonators. In another embodiment, the coupler, which couples the pump lasers to the gain section, is located at least partially within said resonators. In a preferred embodiment the resonators are provided with polarization selection properties, and the outputs of the pump lasers are coherent.

6 Claims, 2 Drawing Sheets

MULTIPLE FIBER LASER PUMP SOURCES

This application claims priority from provisional application Ser. No. 60/026,906 filed on Sep. 26, 1996.

BACKGROUND OF THE INVENTION

This invention relates to fiber laser pump sources and, more particularly, to optical devices, such as fiber amplifiers and fiber lasers, which are pumped by the combined output of a plurality of fiber lasers.

In fiber optic telecommunications systems an information-bearing optical signal at one wavelength ($\lambda_s$) is amplified by propagating it through a gain section of rare earth-doped fiber simultaneously with an optical pump signal of a different wavelength ($\lambda_p$). The source of the pump signal is typically a solid state laser; e.g., a diode laser, a fiber laser, or a sapphire laser. In addition, multiple pump sources may be simultaneously coupled to the gain section. Although the use of multiple pump sources increases somewhat the complexity of the amplifier, it can serve several desirable purposes; e.g., to provide higher gain by coupling more optical power into the gain section than is possible or desirable from a single pump laser; to enable each of the pump lasers to be operated at a lower power level for a given amplifier gain, thereby extending the lifetime of the pump lasers and hence the reliability of the amplifier; and to provide redundancy in the event that one of the pump lasers were to fail.

Known schemes for coupling multiple pump lasers to a FAMP gain section include an arrangement which employs a pair of wavelength division multiplexers (WDMs)—one WDM couples a co-propagating pump signal from one pump laser to the gain section and the other couples a counter-propagating pump signal from the other laser to the gain section. In this arrangement, the pump lasers (typically diode lasers) have separate, non-overlapping resonators. See, for example, "*Optical Fiber Amplifiers: Design and System Applications,*" A Bjarklev, Artech House, Inc., Boston-London 1993, p. 196, FIG. 8.2(*a*), which is incorporated herein by reference.

SUMMARY OF THE INVENTION

In accordance with one aspect of our invention, a device is pumped by first and second pump lasers which have at least partially overlapping resonators, and the device is located external to the resonator.

Viewed from another aspect, the device is pumped by first and second pump lasers which have at least partially overlapping resonators, and the pump lasers are coupled to the device via an intracavity coupler.

In one embodiment, the device is the gain section of a FAMP; in another it is the active medium of a fiber laser.

BRIEF DESCRIPTION OF THE DRAWINGS

The invention, together with its various features and advantages, can be readily understood from the following more detailed description taken in conjunction with accompanying drawing, in which.

In the interests of clarity, the figures have not been drawn to scale.

DETAILED DESCRIPTION

Figure 1:
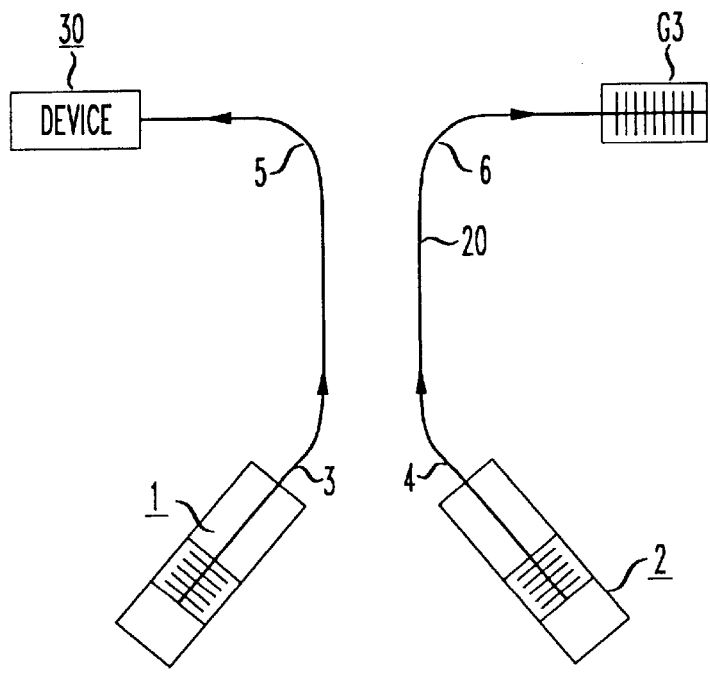
FIG. 1 is a schematic of a fiber laser pump arrangement for delivering an optical pump signal to a device 30, in accordance with one embodiment of our invention.

With reference now FIG. 1, we describe an optical arrangement which utilizes an intracavity coupler 20 and a grating reflector G3 to combine the outputs of a plurality of fiber lasers and to deliver the combined output to a device 30. Two fiber lasers 1 and 2 are depicted for purposes of illustration. More than two are within the scope of the invention. Also within the scope of the invention is the use of diode lasers in lieu of the fiber lasers. The device 30 may be any device which can utilize, respond to, act upon, etc. the combined output of the lasers; e.g., device 30 may be the active medium of a fiber laser or the gain section of an optical fiber amplifier (FAMP). For purposes of exposition, we will continue the description of the invention in the context of a FAMP embodiment with the understanding that the basic principles set forth, as well as much of the specific implementation, apply equally as well to other devices.

Figure 2:
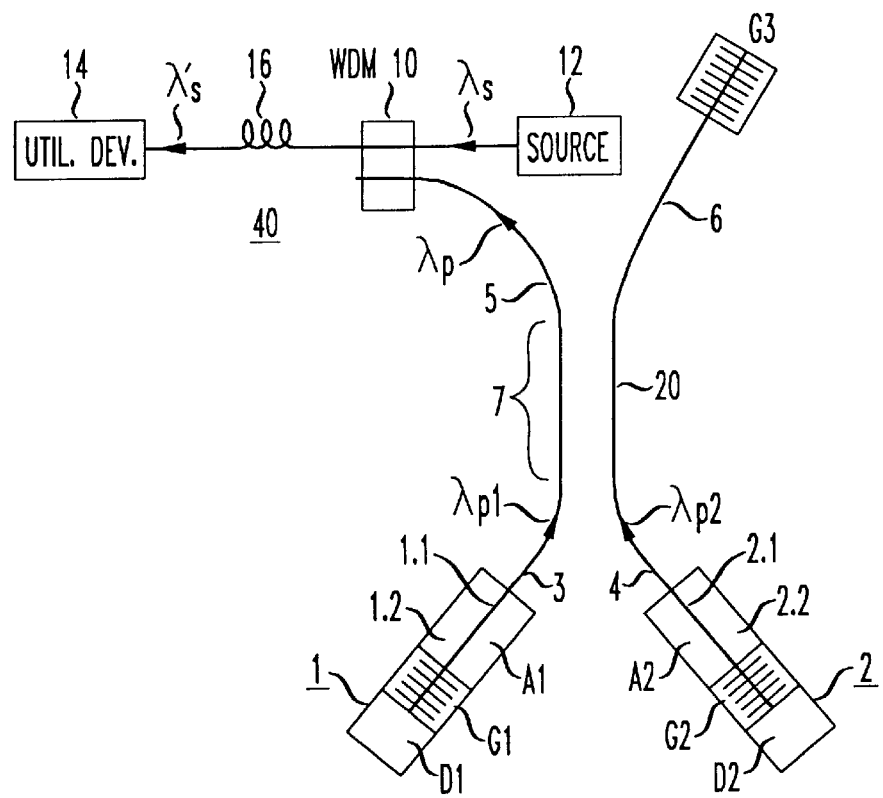
FIG. 2 is a schematic of an optical fiber amplifier in accordance with another embodiment of the invention.

Thus, in FIG. 2, we describe an optical communication system comprising a source 12 of an information-bearing signal $\lambda_s$ to be amplified, a utilization device 14 to which the amplified information signal is to be delivered, and a FAMP 40 for amplifying the information signal. The source and utilization device may be pieces of terminal equipment, sections of transmission fiber, or other FAMPs in the system, etc. In the latter case, the system would include a multi-stage FAMP configuration. The FAMP is illustratively depicted as being double pumped; i.e., FAMP 40 may be viewed as comprising two pump lasers 1 and 2 coupled to fiber gain section 16 (corresponding to device 30 of FIG. 1) via a suitable 2×2 coupler 20 and a WDM 10. Pump laser 1 provides pump light $\lambda_{p1}$, whereas pump laser 2 provides pump light $\lambda_{p2}$. The use of different subscripts p1 and p2 is primarily a matter of convenience. As discussed later, when $\lambda_{p1}$ and $\lambda_{p2}$ are coherent, then $\lambda_{p1}=\lambda_{p2}$. Alternatively, FAMP 40 may be viewed as comprising a single pump laser having a complex resonator which includes the active media of both pump sources as well as at least a portion of coupler 20. Of course, the use of two pump sources in conjunction with a 2×2 coupler is illustrative only; more than two pump sources and other coupling schemes (e.g., M×N couplers) are contemplated by the invention.

More specifically, in accordance with one embodiment of our invention, the FAMP 40 is designed so that the pump lasers 1 and 2 have a common resonator, and the 2×2 coupler 20 is located at least partially within that resonator. The common resonator is formed by fiber grating reflectors G1, G2 and G3 coupled to three ports of the 2×2 coupler 20. The fourth port, representing the combined outputs of pump lasers 1 and 2, is coupled to gain section 16. In addition, grating G1 is coupled to fiber active medium A1 of pump laser 1, and grating G2 is coupled to fiber active medium A2 of pump laser 2. The active media A1 and A2 are, in turn, coupled to the interaction (or coupling) section 7 of coupler 20 via single mode fibers 3 and 4, respectively. Likewise, the WDM 10 and grating G3 are coupled to coupling section 7 via single mode fibers 5 and 6, respectively. Note, the portion of coupler 20 formed by fiber 5 need not be, and as illustratively shown is not, included within the resonator formed by G1, G2 and G3; the coupling section 7 and fibers 3, 4 and 6, however, are within the resonator. Other components, not shown, may be included in the resonator, and the sequence of the components shown may be altered as long as the integrity of the common resonator and the intracavity nature of the coupler 20 are both maintained.

The fiber active media A1 and A2 are themselves energized by separate sources depicted illustratively as diode lasers D1 and D2 coupled, respectively, to gratings G1 and G2. The latter are designed to be highly transmissive at the lasing wavelength $\lambda_d$ of the diode lasers, yet highly reflective at the lasing wavelengths $\lambda_{p1}$ and $\lambda_{p2}$ of the fiber pump lasers. Grating G3 in one embodiment is also highly reflective at $\lambda_{p1}$ and $\lambda_{p2}$ which implies that $\lambda_{p1}$ and $\lambda_{p2}$ are not coherent. An illustration of high reflectivity is nearly 100 percent reflectivity, although less than 100 percent may be acceptable in some applications.

In operation, the output of diode lasers at $\lambda_d$ is coupled through the gratings G1 and G2 and absorbed in the active media A1 and A2, respectively. The latter undergo stimulated emission of light at $\lambda_{p1}$ and $\lambda_{p2}$, which are typically (although not necessarily) essentially identical wavelengths. These emissions constitute two co-propagating pump signals which are coupled via coupler 20 and fiber 5 to WDM 10. The information signal and the co-propagating pump signal are coupled to gain section 16 via WDM 10. Co-propagating pump and information signals give the lowest noise figure in high gain, high power FAMPs. However, the direction of the information signal $\lambda_s$ relative to the pump signal could readily be reversed so that the two would be counter-propagating, an arrangement which may be preferred for overall system performance of low gain FAMPs.

One advantage of our FAMP is a simpler, more easily fabricated design brought about by the need for only three grating reflectors. In contrast, if an FAMP were double-pumped by a pair of separate fiber pump lasers (akin to the prior art FAMP double pumped by a pair of diode lasers, Bjarklev, supra, at p. 196), it would have four grating reflectors; i.e., a pair of gratings forming a separate resonator for each pump laser. In addition, our invention enables the combined outputs of the two pump lasers to be coupled through a single WDM into the FAMP, whereas prior art schemes have used a pair of WDMs and do not combine the pump signals before applying them to the FAMP gain section.

Although our FAMP design increases the number of intracavity components (which may introduce loss), and hence may increase the lasing threshold of the pump lasers, the power available from the pump lasers is expected to be more than sufficient to overcome any such additional losses without sacrificing amplifier performance or reliability.

In a preferred embodiment, the fiber pump lasers 1 and 2 are double clad fiber lasers of the type described in corresponding application Ser. No. 08/659853 filed on Jun. 7, 1996 (DiGiovanni 26-7-11-5-53), now U.S. Pat. No. 5,659,644 which is incorporated herein by reference. In that case, the diode lasers D1 and D2 are coupled to gratings G1 and G2, respectively, via segments of multimode fiber (not shown). In addition, the diode lasers may be coupled to the gratings themselves via well-known lens arrangements or well-known butt coupling schemes.

It is also preferred that the fiber active media A1 and A2 be designed to enhance the coupling between the pump signal from the laser diodes and the single mode cores 1.1 and 2.1 of the active media. To this end, the "star" fiber design described by one of us, D. J. DiGiovanni, in copending application Ser. No. 08/957,949 filed on Oct. 27, 1997, now U.S. Pat. No. 5,873,923, which is a division of Ser. No. 08/561682 filed on Nov. 22, 1995, now abandoned (DiGiovanni 23) is particularly advantageous. This application is also incorporated herein by reference. Briefly, and as shown in FIG. 2, an exemplary star fiber includes a single mode silica core 1.1, 2.1 (having a nominally circular cross-section) surrounded by a lower refractive index silica cladding 1.2, 2.2 (having a star-like cross-section), respectively. The latter is, in turn, surrounded by a yet lower index polymer cladding, not shown (having a nominally circular cross-section). The star-like cross-section of the claddings 1.2, 2.2 serve to reflect the pump light $\lambda_d$ so that it intersects the single-mode cores 1.1, 2.1 a plurality of times, thereby causing them to lase at the pump wavelengths $\lambda_{p1}$, $\lambda_{p2}$, respectively.

The fiber gratings are advantageously Bragg gratings which are UV-written into a single mode fiber using, illustratively, the technique described in *Optics Letters*, Vol. 14, No. 15 (Aug. 1, 1989), pp. 823–825, which is incorporated herein by reference. As shown in FIG. 2 herein, the gratings appear to extend outside the single mode cores 1.1 and 2.1; that depiction is for clarity only; in practice, the gratings are confined to the single mode cores. Also, the gratings may be separate fiber sections fused to the active media or may be formed on the same fiber as the active media.

The WDM 10 and other devices for routing signals are described, for example, in Bjarklev, supra, at pp. 160–161, which is incorporated herein by reference. On the other hand, the 2×2 fiber coupler is well-known in the art and can be viewed as a WDM in which the wavelength sensitive characteristics of the WDM are not exploited.

Each of the laser diodes D1 and D2 may be single laser, an array of lasers, a single laser with multiple active stripes, or any other design suitable for coupling sufficient power at $\lambda_d$ into the active media A1 and A2, respectively. The composition of the laser diode, in particular its active region, is determined by the desired wavelength $\lambda_d$; for example, AlGaAs laser diodes are suitable for operation at $\lambda_d$ wavelengths in the range of about 800–870 nm, whereas InGaAs laser diodes (e.g., of the strained quantum well variety) are suitable for wavelengths in the range of about 870–1000 nm.

Although not explicitly shown in the schematic figure, the joining of the various sections of fibers, including the fiber gratings to the active media and the latter to the transmission fibers, may be accomplished by well-known, low loss fusion splices of the type described in U.S. Pat. No. 5,074,633 granted to L. G. Cohen et al. on Dec. 24, 1991 and incorporated herein by reference.

Illustratively, the gain section 16 comprises a single mode silica Er—Yb doped fiber for amplifying an information signal at a wavelength $\lambda_s \approx 1550$ nm; the coupler fibers 3, 4, 5 and 6 are single mode silica fibers; the active media A1 and A2 are Nd-doped single mode "star" fibers which emit pump signals at $\lambda_p \approx 1060$ nm when excited by GaAs—AlGaAs laser diodes D1 and D2, respectively, which generate radiation at about 800 nm. The gratings G1, G2 and G3 have high reflectivity at the pump wavelength (1060 nm), and the gratings G1 and G2 low reflectivity at the diode laser wavelength (800 nm).

Figure 3:
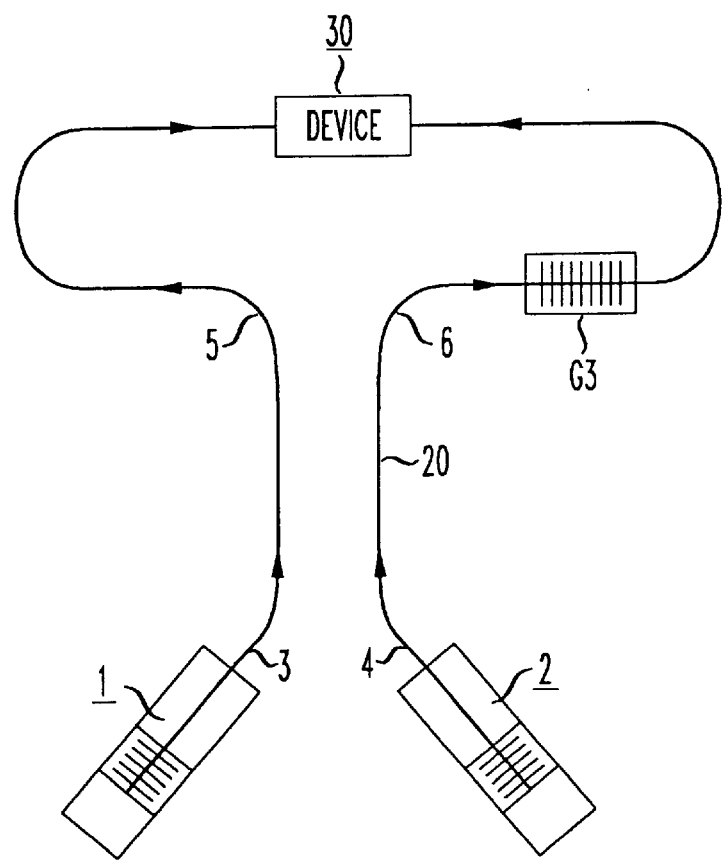
FIG. 3 is a schematic of a fiber laser pump arrangement in accordance with yet another embodiment of our invention in which the power out of both ports of coupler 20 is delivered to device 30.

The coherency of the pump laser outputs $\lambda_{p1}$ and $\lambda_{p2}$, as well as reflectivity of grating G3, determines whether optical energy is coupled out of fiber 5, fiber 6 or both. Thus, as described above, when the pump laser outputs are incoherent and grating G3 has essentially 100% reflectivity at $\lambda_{p1}$ and $\lambda_{p2}$, then essentially all of the pump energy emerges from fiber 5. But if grating G3 has less than 100% reflectivity, then the pump energy will emerge from both fibers 5 and 6. In this case, fibers 5 and 6 may be coupled to the same device 30, as shown in FIG. 3, or to separate devices (not shown). Device 30 is illustratively a FAMP and the scheme for coupling fibers 5 and 6 thereto contemplates both bidirectional pumping of the FAMP as well as unidirectional pumping.

Figure 4:
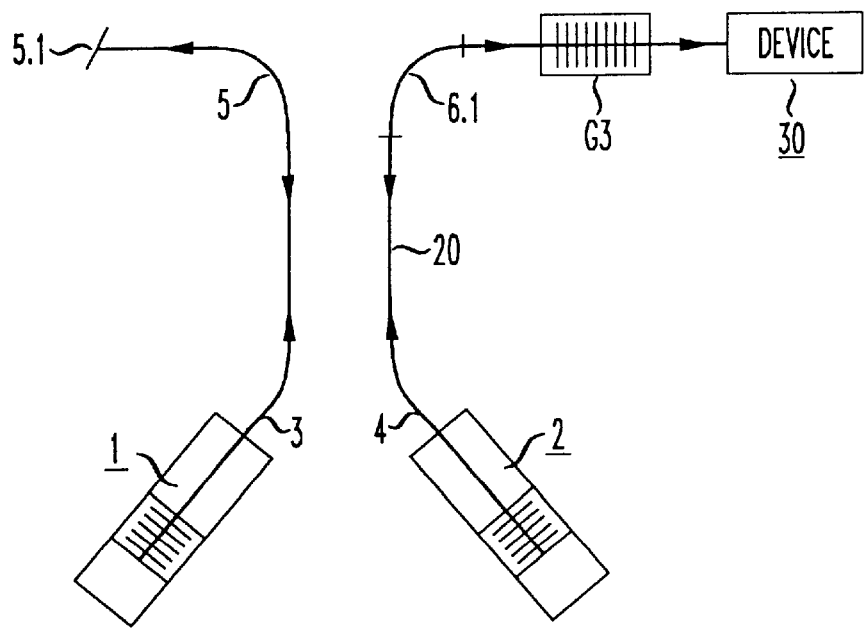
FIG. 4 is a schematic of a fiber laser pump arrangement in accordance with a preferred embodiment of our invention which enhances polarization stability.

On the other hand, when the pump laser outputs $\lambda_{p1}$ and $\lambda_{p2}$ are substantially coherent, then the pump energy emerges from fiber 6 through grating G3 and can be. In this case, the reflectivity of grating G3 at the pump wavelength may be relatively low (e.g., less than 50% and illustratively 5–10%). Coherency implies that the polarizations of $\lambda_{p1}$ and $\lambda_{p2}$ are the same and that $\lambda_{p1}=\lambda_{p2}$. To this end we have found that coherence stability is enhanced if the resonator formed by gratings G1, G2 and G3 provides for polarization selection (i.e., selection of either the TE or TM mode). This type of selection may be accomplished by introducing polarization dependent properties into the resonator such as birefringence or possibly polarization dependent loss. For example, we have found that a segment of polarization maintaining fiber (PMF) within the resonator enhances coherence stability. FIG. 4 shows such a section of PMF 6.1 positioned between coupler 20 and grating G3. However, it could be located elsewhere within the resonator. In this embodiment, the end of fiber 5 is terminated at 5.1 to provide for low back reflections of residual pump energy, if any, which is coupled into fiber 5. Well-known terminations such a beveled end face or a coreless fiber section are suitable for this purpose. If termination 5.1 provides some optical feedback, then fiber 5 would be considered to be within the resonator. In that case, all or a portion of fiber 5 could be PMF to provide coherence stability.

Alternatively, coupler 20 could be made of PMF to provide such stability.

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention.

The invention claimed is:

1. Optical apparatus comprising a pump laser for generating a pump signal, said pump laser comprising at least first and second fiber lasers having at least partially overlapping resonators, and an intracavity coupler for coupling said pump signal to a utilization device, characterized in that said lasers generate intracavity outputs which are coherent with one another, and said resonators include means for providing polarization selection therein.

2. The apparatus of claim 1 wherein said polarization selection means comprises at least a portion of the optical path of said resonators having birefringence properties.

3. The apparatus of claim 2 wherein said coupler has birefringence properties.

4. The apparatus of claim 1 further characterized in that said coupler comprises a fiber coupler having at least four ports, a first reflector and a first fiber active medium are coupled to a first port, a second reflector and a second fiber active medium are coupled to a second port, a third reflector is coupled to a third port, and said device is coupled to said third port or to a fourth port, so that said first and third reflectors form a first resonator with said first active medium and at least a portion of said coupler is located within said first resonator, and said second and third reflectors form a second resonator with said second active medium, and said coupler portion is also located within said second resonator.

5. The apparatus of claim 4 wherein said first and second reflectors have high reflectivity at the wavelength of said pump signal and said third reflector has relatively low reflectivity at said wavelength, and said device is coupled to said third port.

6. The apparatus of claim 1 further characterized in that said device comprises an optical fiber which exhibits gain in response to said pump signal.

\* \* \* \* \*